United States Patent
Peng et al.

(10) Patent No.: US 12,486,317 B2
(45) Date of Patent: Dec. 2, 2025

(54) FUNGAL (1,3)-BETA-D GLUCAN-DIRECTED MONOCLONAL ANTIBODY, CODING GENES THEREOF, EXPRESSION THEREOF AND APPLICATION THEREOF

(71) Applicant: HEBEI TELLGEN LIFE SCIENCE CO., LTD., Shijiazhuang (CN)

(72) Inventors: Bo Peng, Shijiazhuang (CN); Shaochen Tan, Shijiazhuang (CN); Ning Li, Shijiazhuang (CN)

(73) Assignee: HEBEI TELLGEN LIFE SCIENCE CO., LTD., Shijiazhuang (CN)

( * ) Notice: Subject to any disclaimer, the term of this patent is extended or adjusted under 35 U.S.C. 154(b) by 493 days.

(21) Appl. No.: 18/070,516

(22) Filed: Nov. 29, 2022

(65) Prior Publication Data

US 2023/0340088 A1    Oct. 26, 2023

Related U.S. Application Data (63) Continuation-in-part of application No. PCT/CN2022/107379, filed on Jul. 22, 2022.

(30) Foreign Application Priority Data

Sep. 7, 2021   (CN) .......................... 202111045511.1

(51) Int. Cl.
   *C07K 16/14*   (2006.01)
   *G01N 33/543*  (2006.01)
   *G01N 33/58*   (2006.01)

(52) U.S. Cl.
   CPC ....... *C07K 16/14* (2013.01); *G01N 33/54326* (2013.01); *G01N 33/582* (2013.01); *G01N 2333/37* (2013.01); *G01N 2400/24* (2013.01)

(58) Field of Classification Search
   CPC ............ C07K 16/14; G01N 33/54326; G01N 33/582; G01N 2333/37; G01N 2400/24; G01N 33/56961; G01N 33/577; G01N 33/583; G01N 2469/10; Y02A 50/30
   See application file for complete search history.

(56) References Cited

U.S. PATENT DOCUMENTS

2002/0173035 A1   11/2002   Lee et al.

FOREIGN PATENT DOCUMENTS

| CN | 110885372 A | 3/2020 | |
| CN | 112940114 A | 6/2021 | |
| CN | 113249336 A * | 8/2021 | ........... G01N 33/581 |
| CN | 113929776 | 1/2022 | |
| WO | WO-2004036222 A1 * | 4/2004 | ............. C07K 16/14 |
| WO | WO-2020184409 A1 * | 9/2020 | ......... G01N 33/5308 |

OTHER PUBLICATIONS

ISR of PCT/CN2022/107379.

* cited by examiner

*Primary Examiner* — Shafiqul Haq
(74) *Attorney, Agent, or Firm* — Zhigang Ma

(57) ABSTRACT

The present application provides a fungal (1,3)-Beta-D glucan-directed monoclonal antibody, coding genes thereof, expression thereof and application thereof and belongs to the technical area of medicine & biomedical detection. The antibody contains complementarity determining regions of a light chain variable region and its amino acid sequences contain: VL-CDR1 shown by SEQ ID NO:1, VL-CDR2 shown by SEQ ID NO:2 and VL-CDR3 shown by SEQ ID NO:3; the antibody also contains complementarity determining regions of a heavy chain variable region and its amino acid sequences contain: VH-CDR1 shown by SEQ ID NO:4, VH-CDR2 shown by SEQ ID NO:5 and VH-CDR3 shown by SEQ ID NO:6. This antibody specifically binds with the fungal (1,3)-Beta-D glucan, has strong antibody affinity and does not trigger cross reaction with interference substances.

13 Claims, 4 Drawing Sheets

Specification includes a Sequence Listing.

cells from the first ground of subcloning cells from the third ground of subcloning cells from the fifth ground of subcloning monoclonal cells

FUNGAL (1,3)-BETA-D GLUCAN-DIRECTED MONOCLONAL ANTIBODY, CODING GENES THEREOF, EXPRESSION THEREOF AND APPLICATION THEREOF

CROSS-REFERENCE TO RELATED APPLICATION

The present application claims the priority of the Chinese patent application No. CN202111045511.1 submitted on Sep. 7, 2021. The contents disclosed in the prior application are incorporated into the present application by reference in its entirety.

REFERENCE TO SEQUENCE LISTING

The Sequence Listing re-submitted concurrently herewith under 37 CFR § 1.821 in a computer readable form (CRF) via EFS-Web as file name SEQUENCE LISTING-v1.xml is incorporated herein by reference. The electronic copy of the Sequence Listing was created on May 5, 2023, with a file size of 17 KB.

TECHNICAL AREA

The present application belongs to the technical area of medicine & biomedical detection, more especially, relates to a fungal (1,3)-β-D glucan-directed monoclonal antibody, coding genes thereof, expression thereof and application thereof.

BACKGROUND ART

The invasive fungal infection (IFI) refers to the pathophysiological procedure during which time the fungus invades human tissues, blood or organs, and grows and reproduces therein, thereby causing tissue damages, organ dysfunctions and inflammatory response pathological changes. In recent years, due to the wide use of immunosuppressive agents, wide-spectrum antibiotics, glucocorticoids, antineoplastic drugs etc. and the application of catheters and catheterization in surgical procedures, the morbidity and mortality caused by the invasive fungal infection gradually increases. Moreover, the absence of specificity of IFI clinical symptoms and signs causes the current lack of effective and early diagnosis methods.

At present, major methods of detecting fungal infection include the tissue biopsy method, the blood culture method, the traditional tachypleus amebocyte lysate test, the new generation tachypleus amebocyte lysate test and the molecular biological assay and so on. Wherein, ①the tissue biopsy method belongs to the invasive detection with a great difficulty in obtaining clinical samples. ②the blood culture method has a strict technical requirement, is of time-consuming and presents a low culture positive rate (some fungus such as aspergillus can hardly be cultured with positive results), resulting in the failure of early diagnosis. ③the traditional tachypleus amebocyte lysate test (namely G test) has an exclusive need of blood cells from the marine crab limulus, but the tachypleus amebocyte lysate has poor specificity and presents great difference in agents between different batches and the test is liable to the interference of the endotoxin (lipopolysaccharide) and certain drugs and shows a high false positive rat, let alone the fact that the limulus has limited source for blood sampling as it is a endangered species and belongs to a second-grade animal under state protection. ④the new generation G test solves problems of the limulus blood source and the endotoxin (lipopolysaccharide) interference by the production of the traditional tachypleus amebocyte lysate via the genetically engineered recombinant limulus blood G factor (namely the artificial tachypleus amebocyte lysate) instead of the wildly gathered or artificially cultured limulus blood, but the problem of a false positive test caused by interferences of (1,3)-β-D glucan analogues (galactomannan, mannan, peptidoglycan, cellulose) and certain drugs (polymyxin, lentinan etc.) still exists. ⑤the molecular biological assay analyses fungus DNA based on the Polymerase Chain Reaction (PCR) but it is still in the research and development stage for the PCR method shows a low positive rate on the fungal infection detection, due to the fact that the fungus has a thick cell wall which can hardly be ruptured to release DNA.

Limitations of the above mentioned various methods make the current early diagnosis of the clinical invasive fungal infection extremely difficult, which means there is an urgent need for a detection method that is suitable for an early diagnosis of the fungal infection with high sensitivity, excellent specificity, small interference and simple operation.

SUMMARY OF THE INVENTION

Technical Problem

To solve the above-mentioned problems, the present application aims to provide a fungal (1,3)-β-D glucan-directed monoclonal antibody, coding genes thereof, expression thereof and application thereof so as to overcome shortcomings of the existing fungal infection detection method.

Technical Solution

In order to realize the above-mentioned targets, the technical solutions adopted in the present application are as follows.

The first aspect of the present application provides a fungal (1,3)-β-D glucan-directed monoclonal antibody, which contains complementarity determining regions of a light chain variable region and complementarity determining regions of a heavy chain variable region.

The amino acid sequences for the complementarity determining regions of a light chain variable region contain VL-CDR1 shown by SEQ ID NO:1, VL-CDR2 shown by SEQ ID NO:2 and VL-CDR3 shown by SEQ ID NO:3.

The amino acid sequences for the complementarity determining regions of a heavy chain variable region contain VH-CDR1 shown by SEQ ID NO:4, VH-CDR2 shown by SEQ ID NO:5 and VH-CDR3 shown by SEQ ID NO:6.

Further, the amino acid sequence for the complementarity determining regions of the light chain variable region in the fungal (1,3)-β-D glucan-directed monoclonal antibody is SEQ ID NO:7; the amino acid sequence for the complementarity determining regions of the heavy chain variable region is SEQ ID NO:8.

The second aspect of the present application provides a gene coding the above-mentioned fungal (1,3)-β-D glucan-directed monoclonal antibody, a nucleotide sequence for the complementarity determining regions of the light chain variable region is SEQ ID NO:9, a nucleotide sequence for the complementarity determining regions of the heavy chain variable region is SEQ ID NO:10.

The second aspect of the present application provides a gene coding the above-mentioned fungal (1,3)-β-D glucan-directed monoclonal antibody, nucleotide sequences for the complementarity determining regions of the light chain variable region are shown by SEQ ID NO:11-13, nucleotide sequences for the complementarity determining regions of the heavy chain variable region are shown by SEQ ID NO:14-16.

The third aspect of the present application provides a recombinant vector containing the gene of the above-mentioned fungal (1,3)-β-D glucan-directed monoclonal antibody.

The recombinant vector is the eukaryotic recombinant expression plasmid pCMVp NEO BAN-Anti-glucan containing the gene of the complementarity determining regions of the variable region in the fungal (1,3)-β-D glucan-directed monoclonal antibody.

The fourth aspect of the present application provides a recombinant expression cell containing genes for the above-mentioned fungal (1,3)-β-D glucan-directed monoclonal antibody.

The recombinant expression cell is the Chinese hamster ovary cell for the recombinant expression of the fungal (1,3)-β-D glucan-directed monoclonal antibody.

The recombinant vector and the recombinant expression cell obtained by introducing the recombinant vector into cells all belong to the protection scope of the present application. The recombinant vector refers to the recombinant vector containing genes of the above-mentioned fungal (1,3)-β-D glucan-directed monoclonal antibody (also refers to the recombinant plasmid) and the recombinant expression cell refers to the recombinant expression cell containing genes of the above-mentioned fungal (1,3)-β-D glucan-directed monoclonal antibody, which are respectively not limited to the eukaryotic recombinant expression plasmid pCMVp NEO BAN-Anti-glucan containing genes for the complementarity determining regions of the variable region in the fungal (1,3)-β-D glucan-directed monoclonal antibody and the Chinese hamster ovary cell for the recombinant expression of the fungal (1,3)-β-D glucan-directed monoclonal antibody, as provided in the present application. It should be understood that the recombinant vector is a recombinant vector obtained by inserting genes of the above-mentioned fungal (1,3)-β-D glucan-directed monoclonal antibody into any expression vector (also known as the expression plasmid) commercially available for a person skilled in the art and the recombinant expression cell is a recombinant expression cell obtained by introducing the above-mentioned recombinant vector into any expression cell, as set forth in the technical solutions seeking protection of the present application.

The fifth aspect of the present application provides a magnetic particle chemiluminescence detection kit for fungal (1,3)-β-glucan, which contains the above-mentioned fungal (1,3)-β-D glucan-directed monoclonal antibody.

In one of the embodiments, the magnetic particle chemiluminescence detection kit for fungal (1,3)-β-D glucan contains the biotin-labeled fungal (1,3)-β-D glucan-directed monoclonal antibody.

In one of the embodiments therein, the magnetic particle chemiluminescence detection kit for fungal (1,3)-β-D glucan also contains the chemiluminescent group-labeled fungal (1,3)-β-D glucan-directed monoclonal antibody.

The sixth aspect of the present application provides a magnetic particle chemiluminescence detection method for fungal (1,3)-β-D glucan, which performs the detection through a magnetic particle chemiluminescence method by means of the above-mentioned magnetic particle chemiluminescence detection kit for fungal (1,3)-β-D glucan.

Beneficial Effect

The fungal (1,3)-β-D glucan-directed monoclonal antibody provided by the present application specifically binds with the fungal (1,3)-β-D glucan, presents a high antibody affinity and will not trigger cross reaction with substances such as endotoxin (e.g. lipopolysaccharide), galactomannan, mannan, peptidoglycan, cellulose, polymyxin and lentinan. The magnetic particle chemiluminescence detection kit for fungal (1,3)-β-D glucan developed based on this antibody property has high sensitivity, excellent specificity, a wide quantitative detection range, a fast detection speed and can realize a mechanically automatic operation, more specifically, it can effectively avoid false positive detection results caused by endotoxin (e.g. lipopolysaccharide), (1,3)-β-D glucan structural analogs (e.g. galactomannan, mannan, peptidoglycan, cellulose) and certain drugs (e.g. polymyxin, lentinan), thereby providing more accurate detection information for clinics, satisfying requirements of clinics on the early diagnosis of fungal infection and presenting excellent clinic application values.

SPECIFIC EMBODIMENTS

Now the technical solutions in embodiments of the present application are described clearly and completely. Although many specific details are set forth in the following description for a comprehensive understanding of the present application, the present application can also be implemented by using other methods different from what are described herein. As a person skilled in the art can make similar extension without departing from the spirits of the present application, the present application is not limited to the following disclosed specific embodiments.

(1,3)-β-D glucan is purchased from Sigma-Aldrich company, CAS Number: 9051-97-2, Article Number: 89862.

Freund's complete adjuvant/Freund's incomplete adjuvant is purchased from Sigma-Aldrich Company, Article Number: F5881/F5506.

Enzyme-labeled second antibody is Horseradish Peroxidase (HRP) labeled goat-anti mouse IgG and is purchased from American Jackson Company, Article Number: 115-035-003.

TMB is purchased from TransGen Company, Article Number: HE111-01.

Chinese hamster ovary cell is purchased from Cell Resource Centre of Institute of Basic Medical Sciences of Chinese Academy of Medical Sciences (cell number: 1101HAM-PUMC000116).

Streptavidin magnetic particles are Dynabeads™ M-270 streptavidin and are purchased from Thermo Fisher Company, Article Number: 65305.

Sulfo-NHS-LC-Biotin is purchased from Shanghai Aladdin Bio-Chem Technology Co., LTD, CAS Number: 191671-46-2, Article Number: S288926.

NSP-SA-NHS is purchased from Meilunbio Co., LTD, CAS Number: 199293-83-9, Article Number: MB3332.

The agents/culture mediums (culture solution) used in the following embodiments are all conventional agents/culture mediums (culture solution), if not otherwise specified.

Embodiment 1 Preparation of Hybridoma Cells

I) Animal Immunization

The monoclonal antibody can be obtained by performing the animal immunization through the conventional immunological technique with (1,3)-β-D glucan being the antigen and then preparing hybridoma cells via immunized animal cells. Types of immunized animals used during the preparation of hybridoma cells are not specifically limited, which can be exemplified as a mouse, a rat, a hamster, a rabbit etc. The present application adopts BALB/c mice as the immunized animals. The antigen presents a better effect in combination use with an adjuvant during the animal immunization for the adjuvant can improve the immunization response of immunized animals to the antigen. Types of the adjuvant are not specifically limited, which can be exemplified as a Freund's complete adjuvant, a Freund's incomplete adjuvant, a pertussis vaccine, an aluminum adjuvant etc., wherein the Freund's complete adjuvant is used in the primary immunization and the Freund's incomplete adjuvant is used in the second and subsequent immunizations in the present embodiment.

(1,3)-β-D glucan and the Freund's complete adjuvant are mixed by equal volume and completely emulsified to be the primary immunization agent.

BALB/c mice (Mouse Number 1, Mouse Number 2 and Mouse Number 3) of 6-8 weeks old are adopted and undergo the subcutaneous multipoint injection by using the primary immunization agent, wherein the dosage of the primary immunization agent equals to that each mouse is injected with 30 μg of (1,3)-β-D glucan. Hereafter, one immunization is performed every 2 weeks. (1,3)-β-D glucan and the Freund's incomplete adjuvant which are mixed by equal volume and completely emulsified start to be used from the second immunization and undergo the intraperitoneal injection, wherein the immunization dosage equals to that each mouse is injected with 30 μg of (1,3)-β-D glucan. 7 days after the fourth immunization, the antibody titer of the venous blood of the mouse medial canthus is tested with Enzyme Linked Immunosorbent Assay (ELISA), wherein the specific antibody titer test (ELISA method) is as follows.

11) coating the antigen: (1,3)-β-D glucan is diluted to 1 μg/mL with the coating buffer solution($Na_2CO_3$ 1.059 g, $NaHCO_3$ 2.93 g, adding ultrapure water to 1000 mL, pH value is adjusted to 9.6), which is added to an elisa plate by 0.1 mL in every well and left overnight at 4° C. The liquid within the well is abandoned the next day and the well is washed 3 times with PBST wash buffer ($KH_2PO_4$ 0.2 g, $Na_2HPO_4·12H_2O$ 2.9 g, NaCl 8.0 g, KCl 0.2 g, Tween-20 0.5 mL, adding ultrapure water to 100 mL, pH value is adjusted to 7.4) with PBST wash buffer 300 μL (when not specified below, the agent and dosage during washing are all the same with the present washing) being added to each well for each washing, which is then patted dry.

12) blocking: each well is added with PBST wash buffer 0.1 mL containing 3% bovine serum albumin (BSA) and is left of incubation at 37° C. for 1 hour, which is then washed for 3 times with PBST wash buffer and patted dry to obtain the elisa plate under test.

13) adding the mouse serum sample under test: venous blood of the different mouse medial canthus are centrifuged at 2000 rpm for 5 minutes to obtain the serum, the serum of different mice (Mouse Number 1, Mouse Number 2 and Mouse Number 3) are all respectively diluted to 1000 times, 10,000 times, 100,000 times, 500,000 times and 1000,000 times with 0.1 mol/L of PBS buffer solution to obtain the immunized mouse serum of different concentration.

100 μL of the immunized mouse serum of different concentration is respectively added into the well of the elisa plate under test, with the unimmunized mouse serum as the negative control and 0.1 mol/L of PBS buffer solution as the blank control, which is left for incubation at 37° C. for 1 hour. The liquid within the well is abandoned and is washed 3 times with PBST wash buffer, which is then patted dry.

14) adding the enzyme-labeled second antibody: firstly the enzyme-labeled second antibody is diluted to the working concentration with the dilution buffer solution (0.1 g of BSA is added to PBST wash buffer to the volume 100 mL), namely the dilutability of 10000 times, to obtain the enzyme-labeled second antibody diluent.

Each well is added with 100 μL of the enzyme-labeled second antibody diluent, which is left for incubation at 37° C. for 1 hour, washed with PBST wash buffer and then patted dry.

15) colouring: each well is respectively added with 100 μL of the chromogenic substrate TMB, which is left for incubation at 37° C. for 15 minutes.

16) terminating the reaction: each well is respectively added with 100 μL of a stop buffer (HCl of 1 mol/L concentration) to terminate the reaction.

17) determining the results: the absorbance value ($A_{450\ nm}$) of each well is tested at 450 nm with a microplate reader by zeroing the blank control well. When the ratio between $A_{450\ nm}$ value of the sample under test and $A_{450\ nm}$ value of the negative control is over 2.1, it is determined as positive and the maximum dilutability of the antibody is the antibody titer. Specific results of the antibody titer test can refer to the following table:

TABLE 1

Antibody titer test (A450 nm) of mice after 4 immunizations

| antibody dilutability | Mouse Number 1 | Mouse Number 2 | Mouse Number 3 | negative control |
|---|---|---|---|---|
| 1:1000 | 2.139 | 2.234 | 1.345 | 1.084 |
|  | 2.058 | 2.355 | 1.356 | 1.203 |
| 1:10,000 | 1.975 | 2.310 | 0.854 | 0.549 |
|  | 1.830 | 2.301 | 0.833 | 0.466 |
| 1:100,000 | 1.233 | 2.179 | 0.403 | 0.112 |
|  | 1.239 | 2.118 | 0.431 | 0.116 |
| 1:500,000 | 0.383 | 0.704 | 0.201 | 0.010 |
|  | 0.310 | 0.630 | 0.189 | 0.009 |
| 1:1000,000 | 0.148 | 0.314 | 0.069 | 0.007 |
|  | 0.155 | 0.302 | 0.056 | 0.011 |

It can be seen from Table 1 that the antibody titer of Mouse Number 2 reaches over 1:100,000. Since that the best antibody titer, that mouse is used for subsequent experiment.

II) Preparation of Hybridoma Cells

1) Preparing Myeloma SP2/0 Cell Suspension

The mouse myeloma cells (SP2/0 cells) are conventionally resuscitated 2 weeks before fusion and are inoculated into a culture medium (the culture medium is RPMI 1640 culture solution containing 10~20% fetal calf serum, which is additionally added with 100 IU/mL of penicillin and 100 m/mL of streptomycin), left in a constant temperature incubator of 5% $CO_2$ and cultured at 37° C. 48~36 hours before the fusion, the culture is enlarged by switching to the complete culture solution (RPMI 1640 culture solution containing 20% fetal calf serum), which is left in a constant temperature incubator of 5% $CO_2$ at 37° C.

On the day of fusion, cells are slowly blew down from the bottle wall with a pipette and collected in a 50 mL centrifuge tube, which are centrifuged at 1500 rpm for 6 minutes and abandoned with the supernatant. 30 mL of an incomplete culture solution [the incomplete culture solution is obtained by additionally adding 2% $NaHCO_3$, 3% 4-hydroxyethyl piperazine ethanesulfonic acid (Hepes) and 0.011% sodium pyruvate into RPMI 1640 and adjusting pH to 6.8~7.0 with 1 mol/L of HCl] is added into the obtained oncocyte precipitation. The obtained solution is centrifuged again at 1500 rpm for 6 minutes and then washed once with PBST wash buffer, after which the microscopic cell observation is performed and cells of equal size and diameter, good transparency and with excellent activity are selected to act as the SP2/0 cell. SP2/0 cells are collected up to a number of $2 \times 10^7$, which are resuspended to 10 mL of an incomplete culture solution and uniformly mixed to obtain myeloma SP2/0 cell suspension.

2) Preparing Immune Spleen Cell Suspension 3 days before cell fusion, Mouse Number 2 is strengthen with immunity through tail intravenous injection by using (1,3)-β-D glucan and the Freund's incomplete adjuvant that are mixed by equal volume and sufficiently emulsified, wherein the dosage of the strengthen immunity equals to that each mouse is injected with 10 μg of (1,3)-β-D glucan. 3 days later, the mouse is enucleated with eyeball to release blood, wherein the serum is separated for the detection of antibody. The mouse is executed from neck and immersed into 75% alcohol for 5 minutes, which is then put onto a super clean bench and operated with the aseptic laparotomy. The spleen is taken out and put into a plate with 8 mL of incomplete culture solution for washing, after which the surrounding connective tissue thereof is carefully stripped off to obtain the processed spleen.

The processed spleen is transferred into another plate with 5 mL of the incomplete culture solution and put on a stainless steel wire of 200 meshes. The processed spleen is cut into small pieces with a scissor and is then squeezed and grinded with a syringe inner core. The steel wire is washed slightly with the incomplete culture solution within the plate to allow all spleen cells to be squeezed into the liquid. The obtained spleen cell solution is transferred into a 50 mL centrifuge tube and the incomplete culture solution is added up to 30 mL, which is then mixed uniformly and centrifuged at 1500 rpm for 6 minutes. After abandoning the supernatant, the incomplete culture solution is added again up to 30 mL, which is then mixed uniformly and again centrifuged at 1500 rpm for 6 minutes. The obtained precipitation cells are added with the incomplete culture solution and resuspended up to 10 mL, which is mixed uniformly to obtain the spleen cell suspension (generally $1-2.5 \times 10^8$ spleen cells can be obtained from each mouse. By means of detection through the Trypan blue stain phase contrast microscope, it is determined as qualified where active cells are over 80%).

3) Cell Fusion

The spleen cell suspension containing $1 \times 10^8$ spleen cells and the myeloma SP2/0 cell suspension containing $2 \times 10^7$ myeloma cells are respectively absorbed and added to a 50 mL of centrifuge tube, which is additionally added with the incomplete culture solution up to 30 mL. The obtained solution is mixed uniformly and centrifuged at 1200 r/min for 6 minutes under room temperature. The supernatant is abandoned, after which the bottom centrifuge tube is slightly flicked to allow precipitation cells to be loose and uniformly pasty. 1 mL of PEG 1650 is dropped into the tube along the rotating centrifuge tube wall under a 37° C. water bath condition and the tube is stewed for 90 seconds, after which the centrifuge tube is taken out from the water bath and centrifuged at 1000 r/min for 6 minutes. The supernatant solution is abandoned and the obtained precipitation is added with 10 mL HAT culture solution, after which the precipitated cells are slightly blew and absorbed. The obtained solution is suspended and mixed uniformly to obtain the fused cell suspension.

The fused cell suspension is added into a 96-well culture plate containing HAT culture solution, which is added with 2 drops in each well and is left in a constant temperature incubator for culture at 37° C. for 7 days. The culture solution is exchanged after 7 days, wherein ½~⅔ culture solution is sucked out during the exchange of the culture solution (⅔ culture solution is sucked out in the present embodiment) and equal quantity of HT culture solution is added. The culture solution is exchanged again after culture for 7 days, wherein ½~⅔ culture solution is sucked out during the exchange of the culture solution (⅔ culture solution is sucked out in the present embodiment) and equal quantity of the complete culture solution (RPMI 1640 culture solution containing 20% fetal calf serum) to obtain the hybridoma cells suspension.

4) Selection and Detection of Hybridoma Cells

The antibody titer of the hybridoma cell suspension is detected with ELISA method (specific operation steps can refer to the corresponding content in Embodiment 1 Animal immunization), with the complete culture solution being the negative control and 0.1 mol/L of PBS buffer solution being the blank control. The ratio of $A_{450\ nm}$ value of the hybridoma cell suspension to $A_{450\ nm}$ value of the negative control is detected to be over 2.1, which means the antibody titer of the hybridoma cell suspension is positive.

5) Colonization Culture

The hybridoma cell suspension with a positive antibody titer is cultured for 3-5 days in a 24-well culture plate enlarged from a 96-well culture plate. After the hybridoma cells under cloning within the 24-well culture plate are repeatedly blew uniformly with a sample injector, 20 μL of hybridoma cells suspension under cloning is added into 1 mL of PBS buffer solution of 0.1 mol/L concentration, which is diluted by 50 times to obtain the diluted cell suspension.

Cell count is performed to the diluted cell suspension with a cell counting chamber, wherein the calculation formula is: cell amount of the cell suspension/mL=(total amount of cells in 4 lattices of the counting chamber/4)×10000×50 (dilution ratio), wherein the cell amount is $3 \times 10^6$/mL.

Based on the above-mentioned cell count concentration, a cell suspension containing 230 active cells is suspended in 4.6 mL of the complete culture solution (RPMI 1640 culture solution containing 20% fetal calf serum). The obtained active cell solution is inoculated in a 96-well culture plate, wherein each well is inoculated with 0.1 mL active cell solution in total 36 wells (marked as the first group). 4 mL of the complete culture solution (RPMI 1640 culture solution containing 20% fetal calf serum) is added again into the remained 1 mL of active cell solution to obtain 5 mL of active cell solution in total. Then the active cell solution is inoculated again into the remained 36 wells, wherein each well is inoculated with 0.1 mL of active cell solution (marked as the second group). The remained 1.4 mL of active cell solution is additionally added with 1.4 mL of the complete culture solution (RPMI 1640 culture solution containing 20% fetal calf serum). The remained 24 wells are inoculated, wherein each well is inoculated with 0.1 mL of active cell solution (marked as the third group). As such, the cloning is conducted by three different cell concentrations in total, wherein the first group is 36 wells with each well inoculated 5 cells, the second group is 36 well with each well inoculated 1 cell and the third group is 24 wells with each well inoculated 0.5 cell.

Figure 1:
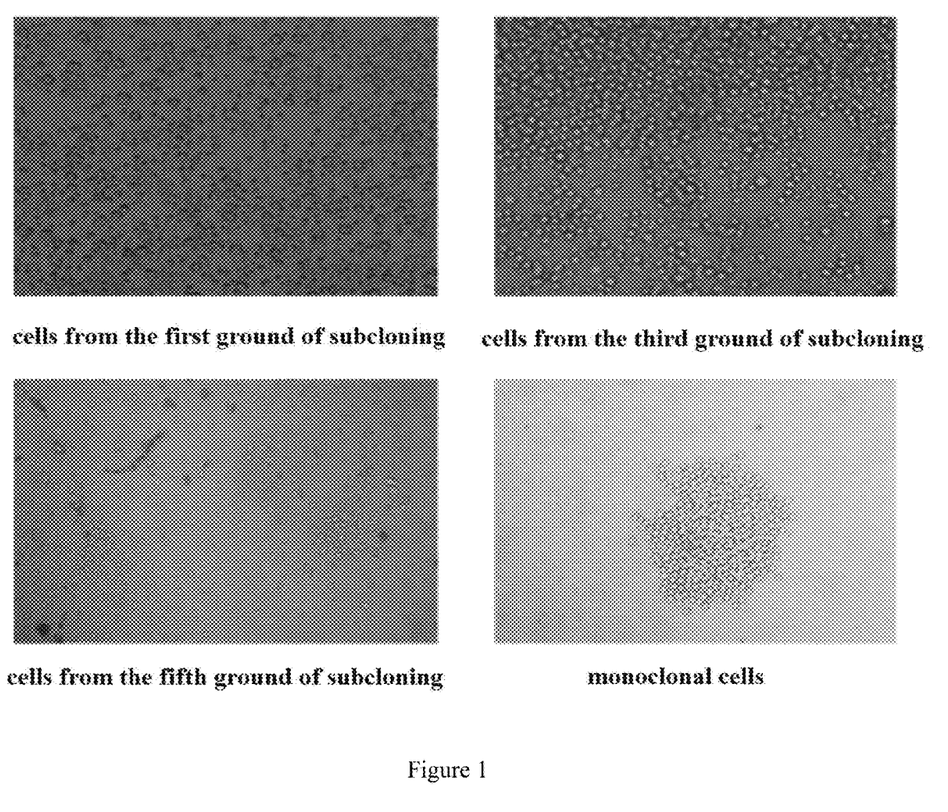
FIG. 1 is the procedure chart of the selecting conditions of cloned cells in Embodiment 1 of the present application.

The 96-well culture plate is left in a constant temperature incubator of 5% $CO_2$ for culture at 37° C. for 5 days, which is turned up-side down to be observed with the cell cloning growth condition under a microscope 5 days later. The culture solution is exchanged and the antibody secretion condition is detected with ELISA method. The monoclonal wells presenting as positive are cloned again based on the above-mentioned cloning method. The monoclonal wells presenting positive in both two times of cloning are selected and transferred into a 24-well culture plate and then retransferred into a cell culture bottle for enlarged culture and for cryopreservation. The specific selection procedure for cloned cells refers to FIG. 1.

6) Cryopreservation of Hybridoma Cells

The cell condition cultured in large scale in the cell culture bottle is observed. The hybridoma cells in the logarithmic growth phase is dumped with the supernatant culture solution and is added with 1 mL of the incomplete culture solution with a pipette, which is added with 0.8 mL of fetal calf serum and 0.2 mL of dimethyl sulfoxide, mixed uniformly, undergoes cell count and is packaged into a cryopreservation tube, wherein each cryopreservation tube is added with no less than $1 \times 10^6$ cells. The cryopreservation tube is left for precooling at 4° C. for 30 minutes and is left at −20° C. for 2 hours, which is then transferred to a −70° C. cryogenic refrigerator overnight and finally put into liquid nitrogen for reservation.

Embodiment 2 Preparation of Fungal (1,3)-β-D Glucan-Directed Monoclonal Antibody The hybridoma cells presenting positive are selected for cloning and the secreted antibody, namely the fungal (1,3)-β-D glucan-directed monoclonal antibody, is collected. The fungal (1,3)-β-D glucan-directed monoclonal antibody is collected and gene sequences for the variable region in the fungal (1,3)-β-D glucan-directed monoclonal antibody is analysed, wherein amino acid sequences for the complementarity determining regions of a light chain variable region consist of VL-CDR1 shown by SEQ ID NO:1, VL-CDR2 shown by SEQ ID NO:2 and VL-CDR3 shown by SEQ ID NO:3, with the specific amino acid sequence being SEQ ID NO:7 and the nucleotide sequence being SEQ ID NO:9, wherein the amino acid sequences for the complementarity determining regions of a heavy chain variable region consist of VH-CDR1 shown by SEQ ID NO:4, VH-CDR2 shown by SEQ ID NO:5 and VH-CDR3 shown by SEQ ID NO:6, with the specific amino acid sequence being SEQ ID NO:8 and the nucleotide sequence being SEQ ID NO:10.

Sequencing Results

A. Sequence information of the light chain variable region
1) VL-CDR1
amino acid sequence: SEQ ID NO:1
nucleotide sequence: SEQ ID NO:11
2) VL-CDR2
amino acid sequence: SEQ ID NO:2
nucleotide sequence: SEQ ID NO:12
3) VL-CDR3
amino acid sequence: SEQ ID NO:3
nucleotide sequence: SEQ ID NO:13
amino acid sequence for the complementarity determining regions of a light chain variable region: SEQ ID NO:7
nucleotide sequence for the complementarity determining regions of a light chain variable region: SEQ ID NO:9

B. Sequence information of the heavy chain variable region
1) VH-CDR1
amino acid sequence: SEQ ID NO:4
nucleotide sequence: SEQ ID NO:14
2) VH-CDR2
amino acid sequence: SEQ ID NO:5
nucleotide sequence: SEQ ID NO:15
3) VH-CDR3
amino acid sequence: SEQ ID NO:6
nucleotide sequence: SEQ ID NO:16
amino acid sequence for the complementarity determining regions of a heavy chain variable region: SEQ ID NO:8
nucleotide sequence for the complementarity determining regions of a heavy chain variable region: SEQ ID NO:10

Sangon Biotech (Shanghai) Co., Ltd. is entrusted to construct the eukaryotic recombinant expression plasmid pCMVp-NEO-BAN-Anti-glucan containing genes for the variable region in the fungal (1,3)-β-D glucan-directed monoclonal antibody.

The eukaryotic recombinant expression plasmid pCMVp-NEO-BAN-Anti-glucan is introduced into the Chinese hamster ovary cell (CHO cell) to obtain the Chinese hamster ovary cell for the recombinant expression of the fungal (1,3)-β-D glucan-directed monoclonal antibody.

The Chinese hamster ovary cell for the recombinant expression of the fungal (1,3)-β-D glucan-directed monoclonal antibody is inoculated into DMEM culture medium containing 10% fetal calf serum, which is added with 1 mmol/L of isopropyl β-D-thiogalactoside (IPTG) as the inducer and induced with expression under 37° C. and 5% $CO_2$ condition for 48 hours to collect the cell culture supernatant (the expression product).

The preparation of the crude extract of the monoclonal antibody IgG through the saturated ammonium sulfate method: 5 mL of the cell culture supernatant is added with 5 mL of normal saline and 10 mL of saturated ammonium sulfate aqueous solution in order, which is left at 4° C. overnight and centrifuged at 3000 rpm for 30 minutes. The supernatant solution is abandoned and the remained precipitation is added with 5 mL of normal saline and 5 mL of saturated ammonium sulfate aqueous solution, which is left at 4° C. overnight and then centrifuged at 3000 rpm for 30 minutes. The supernatant solution is abandoned and the obtained precipitation is added again with 5 mL of normal saline and 2.5 mL of saturated ammonium sulfate aqueous solution, which is left at 4° C. overnight and centrifuged at 3000 rpm for 30 minutes. The supernatant solution is abandoned and the obtained precipitation is dissolved in 2 mL of normal saline, which is conducted with dialysis for 18 hours with normal saline to obtain the crude extract of monoclonal antibody IgG.

The purification of the monoclonal antibody IgG through Protein A gel affinity chromatography: 1 mL of Protein A is packed on a column and is then balanced with 20 mmol/L of sodium phosphate buffer solution (20 mmol/L of Na$_2$PO$_3$ and 20 mmol/L of NaH$_2$PO$_3$ are mixed by equal volume and made with the adjustment of pH=7.0). 5 mL of the crude extract of the monoclonal antibody IgG is repeatedly loaded 20 times on the column at 4° C. and the column is sufficiently washed with 20 mmol/L of sodium phosphate buffer solution until OD280 tested by the spectrophotometric method equals to about 0. Then the buffer solution is exchanged to 0.1 mol/L of glycine-hydrochloric acid buffer solution (pH=2.7) for elution and 500 µL of glycine-hydrochloric acid buffer solution is used for each elution. The elution solution is neutralized with 20 µL of Tris-HCl buffer solution (pH=9.0) of 1.0 mol/L concentration. The obtained antibody elution solution is tested with protein content through CBG method and collected with protein peaks, which is then sufficiently dialyzed with 0.01 mol/L of PBS buffer solution (pH=7.4) to obtain the purified monoclonal antibody IgG.

Figure 2:
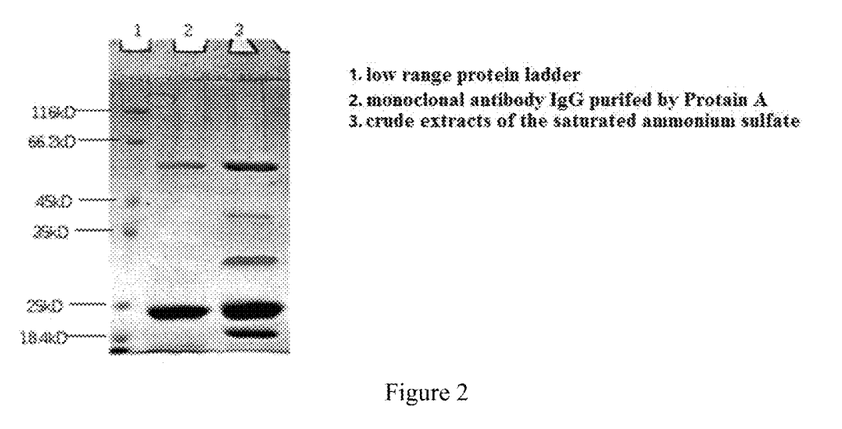
FIG. 2 is the cataphoretic determination result map of Marker and purified monoclonal antibody IgG in Embodiment 2 of the present application.

Marker, the crude extract of the monoclonal antibody IgG and the purified monoclonal antibody IgG are tested through the SDS-PAGE electrophoresis method. With reference to FIG. 2, it can seen that the molecular weights of two chromosome bands calculated based on the molecular weight regression equation from two protein bands are about 54 kD and 25 kD, which complies with the molecular weights of the IgG heavy chains and light chains reported in literatures. Therefore, the purified monoclonal antibody IgG is the purified fungal (1,3)-β-D glucan-directed monoclonal antibody.

Embodiment 3 Titer Test of the Purified Fungal (1,3)-β-D Glucan-Directed Monoclonal Antibody 31) (1,3)-β-D glucan is diluted with the coating buffer solution to 1 µg/mL, added into an elisa plate by 0.1 mL in each well and left at 4° C. overnight. The next day the liquid within the well is abandoned and the well is washed by PBST wash buffer for 3 times and patted dry, wherein each well is added with 300 µL of PBST wash buffer for each washing.

32) each well is added with 0.1 mL of PBST wash buffer containing 3% BSA and left for incubation at 37° C. for 1 hour, which is then washed with PBST wash buffer for 3 times and patted dry to obtain the pore plate under test.

33) the purified fungal (1,3)-β-D glucan-directed monoclonal antibody is respectively diluted by 1000 times, 10,000 times, 100,000 times, 500,000 times, 1000,000 times, 2000,000 times, 5000,000 times and 10000,000 times with 0.1 mol/L of PBS buffer solution to obtain antibody diluents of different concentration.

100 µL of antibody diluents of different concentration are respectively added into wells of the pore plate under test, with the complete culture solution being the negative control and 0.1 mol/L of PBS buffer solution being the blank control, which is left for incubation at 37° C. for 1 hour. The liquid within the well is abandoned, which is then washed with PBST wash buffer for 3 times and patted dry.

34) each well is respectively added with 100 µL of the enzyme-labeled second antibody diluent, which is left for incubation at 37° C. for 1 hour, washed with PBST wash buffer and patted dry.

35) each well is respectively added with 100 µL of chromogenic substrate TMB, which is left for incubation at 37° C. for 15 minutes.

36) each well is added with 100 µL of a stop buffer (HCl of 1 mol/L concentration) to stop the reaction.

Figure 3:
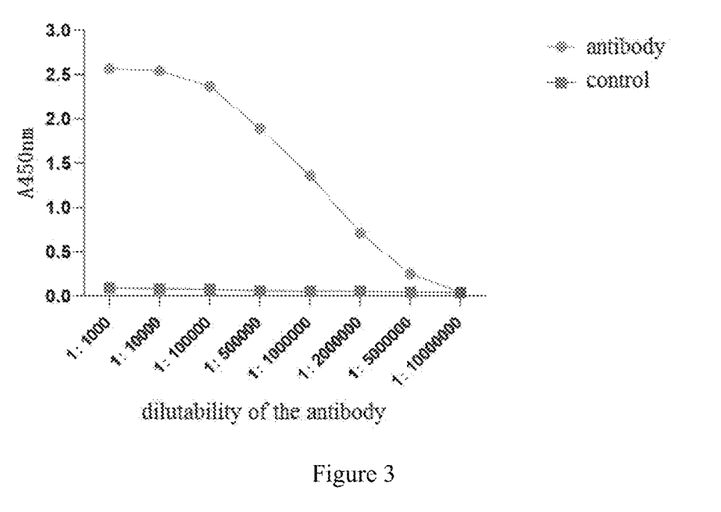
FIG. 3 is the antibody titer test result map of the fungal (1,3)-β-D glucan-directed monoclonal antibody purified by different concentrations in Embodiment 3 of the present application.

37) the absorbance value ($A_{450\ nm}$) of each well is tested at 450 nm with a microplate reader by zeroing the blank control well. When the ratio between $A_{450\ nm}$ value of the sample under test and $A_{450\ nm}$ value of the negative control is over 2.1, it is determined as positive. With reference to FIG. 3, it can be seen that when the purified fungal (1,3)-β-D glucan-directed monoclonal antibody is diluted by 5000,000 times, $A_{450\ nm}$ value is still over 2.1 times of $A_{450\ nm}$ value of the control group, which shows that the purified fungal (1,3)-β-D glucan-directed monoclonal antibody has a titer over 1:5000,000 and presents extremely high affinity.

Embodiment 4 Specificity Identification of the Purified Fungal (1,3)β-D Glucan-Directed Monoclonal Antibody The present application aims to obtain the monoclonal antibody that merely binds with (1,3)-β-D glucan strongly and rarely binds with or does not bind with other detection interference substances. The fungal (1,3)-β-D glucan-directed monoclonal antibody obtained by purification after the recombination expression of the strictly selected and monoclonal hybridoma cells through the genetic engineering technique is identified with specificity again. The specificity of the antibody can be measured by whether the cross-reactivity exists between its analogues with (1,3)-β-D glucan and the size of the cross reaction thereof. The specific identification method is as follows.

41) lipopolysaccharide, galactomannan, mannan, peptidoglycan, polymyxin and (1,3)-β-D glucan are respectively diluted to 10 µg/mL with the coating buffer solution, respectively added into an elisa plate by 0.1 mL in each well and left at 4° C. overnight. The next day the liquid within the well is abandoned and the remained substances are washed by PBST wash buffer for 3 times and patted dry, wherein each well is added with 300 µL of PBST wash buffer for each washing.

42) each well is added with 0.1 mL of PBST wash buffer containing 3% BSA and left for incubation at 37° C. for 1 hour, which is then washed by PBST wash buffer for 3 times and patted dry to obtain the pore plate containing different coated polysaccharide.

43) the purified fungal (1,3)-β-D glucan-directed monoclonal antibody is diluted into purified antibody diluents with the concentration respectively to be 0.001 m/mL, 0.01 m/mL, 0.1 m/mL, 1 µg/mL and 10 µg/mL with 0.1 mol/L of PBS buffer solution.

44) 100 µL of purified antibody diluents of different concentration are respectively added into the pore plate containing different coated polysaccharide and the well containing the same coated polysaccharide all need to add respectively with purified antibody diluents of the above-mentioned 5 concentration, with the complete culture solution being the negative control and the PBS buffer solution being the blank control, which is left for incubation at 37° C. for 60 minutes. The liquid within the well is abandoned and the remained antibody is washed with PBST wash buffer for 3 times, wherein each well is added with 100 µL of the enzyme-labeled second antibody diluent, left for incubation at 37° C. for 1 hour, washed with PBST wash buffer and patted dry.

45) each well is respectively added with 100 μL of chromogenic substrate TMB and left for incubation at 37° C. for 15 minutes.

46) each well is added with 100 μL of a stop buffer (HCl of 1 mol/L concentration) to stop the reaction.

Figure 4:
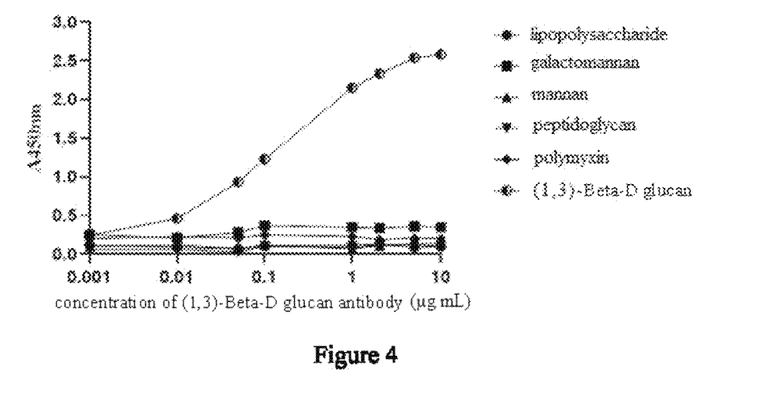
FIG. 4 is the cross reaction test result map of the purified fungal (1,3)-β-D glucan-directed monoclonal antibody with other detection-interference substances in Embodiment 4 of the present application.

47) the absorbance value ($A_{450\ nm}$) of each well is tested at 450 nm with a microplate reader by zeroing the blank control well. When the ratio between $A_{450\ nm}$ value of the sample under test and $A_{450\ nm}$ value of the negative control is over 2.1, it is determined as positive, which means a cross reaction exists between the purified fungal (1,3)-β-D glucan-directed monoclonal antibody under this concentration and the coated polysaccharide. With reference to FIG. 4, it can been seen that for the purified fungal (1,3)-β-D glucan-directed monoclonal antibody in a concentration scope of 0.001-10 μg/mL, no cross reaction exists with the lipopolysaccharide, galactomannan, mannan, peptidoglycan and polymyxin and excellent cross reaction exists with (1,3)-β-D glucan, which shows that the purified fungal (1,3)-β-D glucan-directed monoclonal antibody has excellent specificity and is under extremely small interference degree by other substances.

Embodiment 5 Preparation and Application of the Magnetic Particle Chemiluminescence Detection Kit for Fungal (1,3)-β-D Glucan I) Preparation of the Magnetic Particle Chemiluminescence Detection Kit For Fungal (1,3)-β-D Glucan The present embodiment adopts the purified fungal (1,3)-β-D glucan-directed monoclonal antibody as the capture antibody and/or the detection antibody for the preparation of a clinically applicable magnetic particle chemiluminescence detection kit for fungal (1,3)-β-D glucan. Major components of the kit includes: the biotin-labeled and purified fungal (1,3)-β-D glucan-directed monoclonal antibody, the chemiluminescent group-labeled and purified fungal (1,3)-β-D glucan-directed monoclonal antibody [the present embodiment performs the labelling by adopting the acridine sulfonamide-labeled and purified fungal (1,3)-β-D glucan-directed monoclonal antibody or at least one of the acridine sulfonamide, the acridinium ester, the ruthenium complex, the luminol, (adamantane) 1,2-dioxyethane or alkaline phosphatase], streptavidin magnetic particles (Dynabeads™ M-270 streptavidin), the low value calibration product [(1,3)-β-D glucan dried frozen aquatic product, the concentration thereof after reconstitution with ultrapure water is 50 pg/mL], the high value calibration product [(1,3)-β-D glucan dried frozen aquatic product, the concentration thereof after reconstitution with ultrapure water is 200 pg/mL] and the quality control product [(1,3)-β-D glucan dried frozen aquatic product, the concentration thereof after reconstitution with ultrapure water is 100 pg/mL]; the chemiluminescence trigger solution A (0.1 mol/L of $HNO_3$, 1.32% of $H_2O_2$) and the chemiluminescence trigger solution B (0.35 mol/L of NaOH) and PBST wash buffer.

The purified fungal (1,3)-β-D glucan-directed monoclonal antibody is coupled on the solid phase carrier, wherein the solid phase carrier is at least one of carboxylated magnetic particles and biotinized magnetic particles. The present embodiment adopts carboxylated magnetic particles as the solid phase carrier. Specifically, the magnetic particle chemiluminescence detection kit for fungal (1,3)-β-D glucan is as follows.

51) preparation of the biotin-labeled and purified fungal (1,3)-β-D glucan-directed monoclonal antibody 200 μg of (1,3)-β-D glucan antibody is diluted to 1 mg/mL with 0.02 mol/L of PBS buffer solution (pH=7.4) to obtain the antibody solution.

1 mg of Sulfo-NHS-LC-Biotin (for use of biotin antibody labeling) is dissolved in 100 μL of dimethyl sulfoxide and 3 μL of the obtained solution is added into the antibody solution, which is mixed uniformly and reacted at room temperature away from light for 1 hour. After the reaction is over, the reaction products are put into a dialysis tube (exclusion MW: 8000) for dialysis at 2~8° C. for 24 hours (the dialysis is performed at 4° C. in the present embodiment) with the 0.02 mol/of PBS buffer solution (pH=7.4) being the dialysate. The obtained dialysis product is added into Proclin300 with a 0.1% final concentration and mycose with a 1% final concentration to obtain the biotin-labeled and purified fungal (1,3)-β-D glucan-directed monoclonal antibody, which is sealed at 2~8° C. (4° C. in the present embodiment) away from light for later use. The biotin-labeled and purified fungal (1,3)-β-D glucan-directed monoclonal antibody and the streptavidin magnetic particles can be mixed by 1:1 for later use.

52) preparation of the acridine sulfonamide-labeled and purified fungal (1,3)-β-D glucan-directed monoclonal antibody 200 μg of (1,3)-β-D glucan antibody is diluted to 1 mg/mL with 0.1 mol/L of PBS buffer solution (pH=7.2) to obtain the antibody solution under chemical labelling.

10 μL of NSP-SA-NHS (acridine sulfonazide internal salt) with a concentration of 2 mg/mL is added into the antibody solution under chemical labelling, which is mixed uniformly, reacted at room temperature away from light for 1 hour, again is added with 4 μL of lysine aqueous solution of 10% concentration, mixed uniformly and reacted at room temperature away from light for 30 minutes. After the reaction is over, the reaction products are put into a dialysis tube (exclusion MW: 8000) for dialysis at 2-8° C. (the dialysis is performed at 4° C. in the present embodiment) overnight with the 0.02 mol/L of PBS buffer solution (pH=7.2) as the dialysate, wherein the product is the acridine sulfonamide-labeled and purified fungal (1,3)-β-D glucan-directed monoclonal antibody.

53) preparation of the calibration product and the quality control product

Formulation method of the low value calibration product (50 pg/mL): (1,3)-β-D glucan is added into ultrapure water to formulate the aqueous solution with a concentration of 1 ng/mL. 5 mL of the aqueous solution is added with 20 mL of mannitol solution, 6 mL of polyvinylpyrrolidone (PVP) and 20 mL of new-born calf serum and then added with ultrapure water up to 100 mL, which is mixed uniformly and freeze-dried at low temperature to obtain the low value calibration product (50 pg/mL).

Formulation method of the high value calibration product (200 pg/mL): (1,3)-β-D glucan is added into ultrapure water to formulate the aqueous solution with the concentration of 4 ng/mL. 5 mL of the aqueous solution is added with 20 mL of mannitol solution, 6 mL of polyvinylpyrrolidone (PVP) and 20 mL of new-born calf serum, then added with ultrapure water up to 100 mL, which is mixed uniformly and freeze-dried at low temperature to obtain the high value calibration product (200 pg/mL).

Formulation method of the quality control product (100 pg/mL): (1,3)-β-D glucan is added into ultrapure water to formulate the aqueous solution with the concentration of 2 ng/mL. 5 mL of the aqueous solution is added with 20 mL of mannitol solution, 6 mL of polyvinylpyrrolidone (PVP) and 20 mL of new-born calf serum, then added with ultrapure water up to 100 mL, which is mixed uniformly and freeze-dried at low temperature to obtain the quality control product (100 pg/mL).

II) Applications of the Magnetic Particle Chemiluminescence Detection Kit for Fungal (1,3)-β-D Glucan The automatic detection of the prepared magnetic particle chemiluminescence detection kit for fungal (1,3)-β-D glucan can be realized on a automatic chemiluminescence analyzer through the magnetic particle chemiluminescence method and the specific steps are: 50 μL of streptavidin magnetic particles and 50 μL of biotin-labeled and purified fungal (1,3)-β-D glucan-directed monoclonal antibody are added into a reaction cup, which are mixed uniformly and left for incubation at 37° C. for 15 minutes. Then magnetic particles are separated under applied magnetic field and liquid within the reaction cup is absorbed. 300 μL of PBST wash buffer is added into the reaction cup for washing and the supernatant is absorbed. The washing is repeated for 3 times and then the reaction cup is added with 100 μL of the sample under test, which is mixed uniformly and left for incubation at 37° C. for 15 minutes; again magnetic particles are separated under applied magnetic field and liquid within the reaction cup is absorbed. The reaction cup is added with 300 μL of PBST wash buffer for washing and the supernatant is absorbed. The washing is repeated for 3 times and then the reaction cup is added with 100 μL of acridine sulfonamide-labeled and purified fungal (1,3)-β-D glucan-directed monoclonal antibody, which is mixed uniformly and left for incubation at 37° C. for 15 minutes. Magnetic particles are separated for the third time under applied magnetic field and liquid within the reaction cup is absorbed. The reaction cup is added with 300 μL of PBST wash buffer for washing and the supernatant is absorbed. The washing is repeated for 3 times and the reaction cup is added respectively with 50 μL of chemiluminescence trigger solution A and chemiluminescence trigger solution B. The chemiluminescence value is tested immediately, thereby the content of the fungal (1,3)-β-D glucan in samples under test can be detected.

The magnetic particle chemiluminescence detection kit for fungal (1,3)-β-D glucan in the present application detects the fungal (1,3)-β-D glucan in samples through the sandwich method. The capture antibody coupled with carboxylated magnetic particles (biotin-labeled and purified fungal (1,3)-β-D glucan-directed monoclonal antibody), (1,3)-β-D glucan and the chemiluminescent group modified detection antibody (chemiluminescent group-labeled and purified fungal (1,3)-β-D glucan-directed monoclonal antibody) form the capture antibody-antigen-detection antibody immune complex. After removing substances not binding with magnetic particles through the magnetic separation washing, the trigger solution (chemiluminescence trigger solution A and chemiluminescence trigger solution B in the present embodiment) is added for luminescence. The content of the fungal (1,3)-β-D glucan in samples is analysed by detecting the chemiluminescence intensity. The kit has advantages such high sensitivity, excellent specificity, little interference substance, fast detection speed and the ability of mechanically automatic operation etc, which is suitable for early diagnosis of the clinical fungal infection.

Embodiment 6 Anti-interference Effect of the Magnetic Particle Chemiluminescence Detection Kit for Fungal (1,3)-β-D Glucan The present embodiment adds lipopolysaccharide, galactomannan, mannan, peptidoglycan and polymyxin of difference concentration (the specific addition concentration refers to Table 2) respectively to clinical samples containing 108 pg/mL of and 413 pg/mL of (1,3)-β-D glucan. Samples added with interference substances are tested by the magnetic particle chemiluminescence detection kit for fungal (1,3)-β-D glucan prepared in Embodiment 5 according to the application method in Embodiment 5. The interference degree of interference substances on the detection of (1,3)-β-D glucan is calculated and the calculation formula is as follows.

interference degree (%)=(the actually measured concentration of (1,3)-β-D glucan in samples added with interference substances—the actual concentration of (1,3)-β-D glucan in samples not added with interference substances)/the actual concentration of (1,3)-β-D glucan in samples not added with interference substances×100%.

The interference degree of interference substances on the detection of (1,3)-β-D glucan is calculated and the obtained results can refer to the following table.

TABLE 2

The anti-interference effect of the magnetic particle chemiluminescence detection kit for fungal (1,3)-β-D glucan

| Interferent | Concentration of additioin (ng/mL) | Actual concentration of the sample (1,3)-β-D glucan (108 ng/mL) | | Actual concentration of the sample (1,3)-β-D glucan (413 ng/mL) | |
|---|---|---|---|---|---|
| | | Actually measured concentration of the sample (1,3)-β-D glucan after the addition of the interferent | Interference degree (%) | Actually measured concentration of the sample (1,3)-β-D glucan after the addition of the interferent | Interference degree (%) |
| Lipopolysaccharide | 10 | 109.2 | 1.1 | 421.5 | 2.1 |
| | 50 | 111.4 | 3.1 | 423.3 | 2.5 |
| Galactomannan | 10 | 112.0 | 3.7 | 424.9 | 2.9 |
| | 50 | 113.7 | 5.3 | 428.0 | 3.6 |
| Mannan | 10 | 107.5 | −0.46 | 414.2 | 0.3 |
| | 50 | 112.6 | 4.2 | 415.5 | 0.6 |
| Peptidoglycan | 10 | 109.4 | 1.3 | 420.4 | 1.8 |
| | 50 | 113.9 | 5.5 | 421.7 | 2.1 |
| Polymyxin | 10 | 113.5 | 5.1 | 426.1 | 3.2 |
| | 50 | 112.7 | 4.3 | 428.8 | 3.8 |

It can be seen from the above-mentioned table that even though the magnetic particle chemiluminescence detection kit for fungal (1,3)-β-D glucan prepared in the present application is tested after being added with interference substances of high concentration, its interference degree under the interference substances is still within 5.5%, which shows that the magnetic particle chemiluminescence detection kit for fungal (1,3)-β-D glucan prepared in the present application presents strong anti-interference ability during the detection procedure of clinical samples and can provide more accurate clinical detection data for it can avoid the false positive results caused by interference substances.

Obviously, the described embodiments are merely part of embodiments rather than the entire embodiments in the present application. All other embodiments obtained on the premise that a person skilled in the art does not pay creative labor based on embodiments in the present application all belong to the protection scope of the present application.

What we claim is:

1. A fungal (1,3)-Beta-D glucan-directed monoclonal antibody, the fungal (1,3)-Beta-D glucan-directed monoclonal antibody contains complementarity determining regions of a light chain variable region and complementarity determining regions of a heavy chain variable region; wherein
the amino acid sequences for the complementarity determining regions of the light chain variable region contain VL-CDR1 set forth in SEQ ID NO:1, VL-CDR2 set forth in SEQ ID NO:2 and VL-CDR3 set forth in SEQ ID NO:3, and
the amino acid sequences for the complementarity determining regions of a heavy chain variable region contain VH-CDR1 set forth in SEQ ID NO:4, VH-CDR2 set forth in SEQ ID NO:5 and VH-CDR3 set forth in SEQ ID NO:6.

2. The fungal (1,3)-Beta-D glucan-directed monoclonal antibody according to claim 1, wherein the amino acid sequence for the complementarity determining regions of the light chain variable region in of the fungal (1,3)-Beta-D glucan-directed monoclonal antibody is set forth in SEQ ID NO:7; and the amino acid sequence for the complementarity determining regions of the heavy chain variable region is set forth in SEQ ID NO:8.

3. The fungal (1,3)-Beta-D glucan-directed monoclonal antibody according to claim 1, wherein,
the nucleotide sequences that encode the complementarity determining regions of the light chain variable regions VL-CDR1, VL-CDR2 and VL-CDR3 of the fungal (1,3)-Beta-D glucan-directed monoclonal antibody are set forth in SEQ ID NO:11, SEQ ID NO:12, and SEQ ID NO:13 respectively, and
the nucleotide sequences for genes of the complementarity determining regions of the heavy chain variable regions VH-CDR1, VH-CDR2 and VH-CDR3 of the fungal (1,3)-Beta-D glucan-directed monoclonal antibody are set forth in SEQ ID NO: 14, SEQ ID NO:15, and SEQ ID NO:16 respectively.

4. The fungal (1,3)-Beta-D glucan-directed monoclonal antibody according to claim 2, wherein,
the nucleotide sequences that encode the complementarity determining region of the light chain variable region of the fungal (1,3)-Beta-D glucan-directed monoclonal antibody is set forth in SEQ ID NO:9, and
the nucleotide sequence that encode the complementarity determining regions of the heavy chain variable region of the fungal (1,3)-Beta-D glucan-directed monoclonal antibody is set forth in SEQ ID NO:10.

5. An eukaryotic recombinant expression plasmid pCMVp NEO BAN-Anti-glucan, containing the nucleotide sequences that encode the complementarity determining regions of the light chain and heavy chain variable regions of the fungal (1,3)-Beta-D glucan-directed monoclonal antibody according to claim 3.

6. An eukaryotic recombinant expression plasmid pCMVp NEO BAN-Anti-glucan, containing the nucleotide sequences that encode the complementarity determining regions of the light chain and heavy chain variable regions of the fungal (1,3)-Beta-D glucan-directed monoclonal antibody according to claim 4.

7. A Chinese hamster ovary expression cell comprising: the recombinant expression plasmid pCMVp NEO BAN-Anti-glucan containing the nucleotide sequences that encode the complementarity determining regions of the light chain and heavy chain variable regions of the fungal (1,3)-Beta-D glucan-directed monoclonal antibody according to claim 5.

8. A Chinese hamster ovary expression cell comprising the recombinant expression plasmid pCMVp NEO BAN-Anti-glucan containing the nucleotide sequences that encode the complementarity determining regions of the light chain and heavy chain variable regions of the fungal (1,3)-Beta-D glucan-directed monoclonal antibody according to claim 6.

9. A magnetic particle chemiluminescence detection kit for fungal (1,3)-Beta-D glucan, wherein the magnetic particle chemiluminescence detection kit comprising the fungal (1,3)-Beta-D glucan-directed monoclonal antibody according to claim 1 coupled to the magnetic particle.

10. The magnetic particle chemiluminescence detection kit for fungal (1,3)-Beta-D glucan according to claim 9, wherein the fungal (1,3)-Beta-D glucan-directed monoclonal antibody is coupled to a biotin.

11. The magnetic particle chemiluminescence detection kit for fungal (1,3)-Beta-D glucan according to claim 9, wherein the kit further comprises the fungal (1,3)-Beta-D glucan-directed monoclonal antibody couple to a chemiluminescent group.

12. The magnetic particle chemiluminescence detection kit for fungal (1,3)-Beta-D glucan according to claim 10, wherein the kit also contains the fungal (1,3)-Beta-D glucan-directed monoclonal antibody coupled to a chemiluminescent group.

13. A magnetic particle chemiluminescence detection method for fungal (1,3)-Beta-D glucan, the detection method comprises:
contacting the magnetic particle coupled to the fungal (1,3)-Beta-D-glucan-directed monoclonal antibody of the kit of claim 9, with a sample to capture fungal (1,3)-Bet-D-glucan present in the sample, and
detecting the captured fungal (1,3)-Bet-D-glucan.

* * * * *

```
                       SEQUENCE LISTING

Sequence total quantity: 16
SEQ ID NO: 1            moltype = AA   length = 39
FEATURE                 Location/Qualifiers
source                  1..39
                        mol_type = protein
                        organism = synthetic construct
SEQUENCE: 1
WDIVETQSET PSYASVIPVG GTYVTDIKSI TKCSDKDSE                              39

SEQ ID NO: 2            moltype = AA   length = 31
FEATURE                 Location/Qualifiers
source                  1..31
                        mol_type = protein
                        organism = synthetic construct
SEQUENCE: 2
TLCDRETQEC ESDIKAGQKK RLSRYVPTIN K                                     31

SEQ ID NO: 3            moltype = AA   length = 39
FEATURE                 Location/Qualifiers
source                  1..39
                        mol_type = protein
                        organism = synthetic construct
SEQUENCE: 3
DMEYPESQLG DFGGSGGFVG FVEVKVRRIG EGGVTRSLE                              39

SEQ ID NO: 4            moltype = AA   length = 41
FEATURE                 Location/Qualifiers
source                  1..41
                        mol_type = protein
                        organism = synthetic construct
SEQUENCE: 4
VQSQLEEVSG GRRLVQPTPG STPKLTSAFS DRTAYSGFSW S                           41

SEQ ID NO: 5            moltype = AA   length = 31
FEATURE                 Location/Qualifiers
source                  1..31
                        mol_type = protein
                        organism = synthetic construct
SEQUENCE: 5
QKWVRQAPGK GLEWIGDRST YIPLMSLLKE V                                     31

SEQ ID NO: 6            moltype = AA   length = 40
FEATURE                 Location/Qualifiers
source                  1..40
                        mol_type = protein
                        organism = synthetic construct
SEQUENCE: 6
FTDSKYTPTK VDLMPTDAYY FCANYDRDAV MEWGPEITVS                             40

SEQ ID NO: 7            moltype = AA   length = 109
FEATURE                 Location/Qualifiers
source                  1..109
                        mol_type = protein
                        organism = synthetic construct
SEQUENCE: 7
WDIVETQSET PSYASVIPVG GTYVTDIKSI TKCSDKDSET LCDRETQECE SDIKAGQKKR       60
LSRYVPTINK DMEYPESQLG DFGGSGGFVG FVEVKVRRIG EGGVTRSLE                  109

SEQ ID NO: 8            moltype = AA   length = 112
FEATURE                 Location/Qualifiers
source                  1..112
                        mol_type = protein
                        organism = synthetic construct
SEQUENCE: 8
VQSQLEEVSG GRRLVQPTPG STPKLTSAFS DRTAYSGFSW SQKWVRQAPG KGLEWIGDRS       60
TYIPLMSLLK EVFTDSKYTP TKVDLMPTDA YYFCANYDRD AVMEWGPEIT VS              112
```

| SEQ ID NO: 9 | moltype = DNA length = 327 |
|---|---|
| FEATURE | Location/Qualifiers |
| source | 1..327 |
| | mol_type = other DNA |
| | organism = synthetic construct |

SEQUENCE: 9

```
tgggacatag tagaaacaca aagcgaaaca ccaagctacg caagcgtaat accagtagga   60
ggaacatacg taacagacat aaaaagcata acaaaatgca gcgacaaaga cagcgaaaca  120
ctatgcgaca gagaaacaca agaatgcgaa agcgacataa aagcaggaca aaaaaaaga   180
ctaagcagat acgtaccaac aataaacaaa gacatggaat acccagaaag ccaactagga  240
gacttcggag gaagcggagg attcgtagga ttcgtagaag taaaagtaag aagaatagga  300
gaaggaggag taacaagaag cctagaa                                      327
```

| SEQ ID NO: 10 | moltype = DNA length = 336 |
|---|---|
| FEATURE | Location/Qualifiers |
| source | 1..336 |
| | mol_type = other DNA |
| | organism = synthetic construct |

SEQUENCE: 10

```
gtacaaagcc aactgaaaga agtaagcgga ggaagaagac tagtacaacc aacaccagga   60
agcacaccaa aactaacaag cgcattcagc gacagaacag catacagcgg attcagctgg  120
agccaaaaat gggtaagaca agcaccagga aaaggactag aatggatagg agacagaagc  180
acatacatac cactaatgag cctactaaaa gaagtattca cagacagcaa atacaccaca  240
acaaaagtag acctaatgcc aacagacgca tactacttct gcgcaaacta cgacagagac  300
gcagtaatgg aatggggacc agaaataaca gtaagc                            336
```

| SEQ ID NO: 11 | moltype = DNA length = 117 |
|---|---|
| FEATURE | Location/Qualifiers |
| source | 1..117 |
| | mol_type = other DNA |
| | organism = synthetic construct |

SEQUENCE: 11

```
tgggacatag tagaaacaca aagcgaaaca ccaagctacg caagcgtaat accagtagga   60
ggaacatacg taacagacat aaaaagcata acaaaatgca gcgacaaaga cagcgaa     117
```

| SEQ ID NO: 12 | moltype = DNA length = 93 |
|---|---|
| FEATURE | Location/Qualifiers |
| source | 1..93 |
| | mol_type = other DNA |
| | organism = synthetic construct |

SEQUENCE: 12

```
acactatgcg acagagaaac acaagaatgc gaaagcgaca taaaagcagg acaaaaaaaa   60
agactaagca gatacgtacc aacaataaac aaa                                93
```

| SEQ ID NO: 13 | moltype = DNA length = 117 |
|---|---|
| FEATURE | Location/Qualifiers |
| source | 1..117 |
| | mol_type = other DNA |
| | organism = synthetic construct |

SEQUENCE: 13

```
gacatggaat acccagaaag ccaactagga gacttcggag gaagcggagg attcgtagga   60
ttcgtagaag taaaagtaag aagaatagga gaaggaggag taacaagaag cctagaa    117
```

| SEQ ID NO: 14 | moltype = DNA length = 123 |
|---|---|
| FEATURE | Location/Qualifiers |
| source | 1..123 |
| | mol_type = other DNA |
| | organism = synthetic construct |

SEQUENCE: 14

```
gtacaaagcc aactgaaaga agtaagcgga ggaagaagac tagtacaacc aacaccagga   60
agcacaccaa aactaacaag cgcattcagc gacagaacag catacagcgg attcagctgg  120
agc                                                                123
```

| SEQ ID NO: 15 | moltype = DNA length = 93 |
|---|---|
| FEATURE | Location/Qualifiers |
| source | 1..93 |
| | mol_type = other DNA |
| | organism = synthetic construct |

SEQUENCE: 15

```
caaaaatggg taagacaagc accaggaaaa ggactagaat ggataggaga cagaagcaca   60
tacataccac taatgagcct actaaaagaa gta                                93
```

-continued

```
SEQ ID NO: 16         moltype = DNA  length = 120
FEATURE               Location/Qualifiers
source                1..120
                      mol_type = other DNA
                      organism = synthetic construct
SEQUENCE: 16
ttcacagaca gcaaatacac accaacaaaa gtagacctaa tgccaacaga cgcatactac   60
ttctgcgcaa actacgacag agacgcagta atggaatggg gaccagaaat aacagtaagc  120
```